United States Patent
Tsau et al.

(10) Patent No.: US 6,994,542 B2
(45) Date of Patent: Feb. 7, 2006

(54) AIR FLOW COMPENSATION FOR MOLD CARRIER

(75) Inventors: Tar Tsau, Burlington (CA); Reinhold Ernst Nitsche, Caledonia (CA); Kyi San Kyi, Burlington (CA)

(73) Assignee: Wentworth Mold Inc., Hamilton (CA)

( * ) Notice: Subject to any disclaimer, the term of this patent is extended or adjusted under 35 U.S.C. 154(b) by 227 days.

(21) Appl. No.: 10/747,190

(22) Filed: Dec. 30, 2003

(65) Prior Publication Data

US 2005/0142243 A1   Jun. 30, 2005

(51) Int. Cl.
B29C 49/42   (2006.01)

(52) U.S. Cl. .................. 425/405.1; 425/522; 425/541
(58) Field of Classification Search ................ 425/168, 425/522, 541, 405.1, 451.9
See application file for complete search history.

(56) References Cited

U.S. PATENT DOCUMENTS

| | | | |
|---|---|---|---|
| 3,782,879 A | 1/1974 | Mnilk et al. | |
| 4,427,360 A | 1/1984 | Albrecht et al. | |
| 4,762,486 A | 8/1988 | Windstrup et al. | |
| 4,938,680 A | 7/1990 | Guarriello et al. | |
| 5,326,250 A | 7/1994 | Doudement | |
| 5,411,391 A | 5/1995 | Albrecht et al. | |
| 5,486,103 A | 1/1996 | Meiring et al. | |
| 5,599,566 A | 2/1997 | Casolari | |
| 5,700,496 A | 12/1997 | Bacon | |
| 5,968,560 A | 10/1999 | Briere et al. | |
| 5,993,721 A | 11/1999 | Kurihara et al. | |
| 6,099,286 A | 8/2000 | Nitsche | |
| 6,729,868 B1 * | 5/2004 | Vogel et al. ............. | 425/405.1 |

FOREIGN PATENT DOCUMENTS

FR   2 659 265 A1   9/1991

* cited by examiner

Primary Examiner—Robert B. Davis (57) ABSTRACT

A mold half carrier has first and second air flow compensating surface areas. The second air flow compensating surface area encloses the first air flow compensating surface area. The first air flow compensating surface area provides pressure compensation for formation of smaller containers. Both air flow compensating surface areas are utilized for formation of larger containers. A shut off valve controls air flow through a passage in the mold carrier extending between the first and second air flow compensating surface areas. The second air flow compensating surface area has an exhaust passage for bleeding unwanted pressurized air therefrom when the shut off valve is closed. The compensating surface areas are separated from each other by a common continuous groove and an O-ring mounted in the groove. The groove has an arcuate main portion for receiving the O-ring and an auxiliary portion into which a portion of the O-ring may collapse.

32 Claims, 7 Drawing Sheets

AIR FLOW COMPENSATION FOR MOLD CARRIER

FIELD OF THE INVENTION

The present invention relates to a mold carrier able to provide varying compensation forces dependent on the size of the mold shell cavity so as to maintain the mold shells closed during formation of a container in the cavity.

BACKGROUND OF THE INVENTION

Typical universal mold assemblies for manufacturing plastic containers include two half mold carriers each adapted to carry one half of a mold shell. Each mold shell half is interchangeable with a corresponding mold carrier to allow for different shaped articles to be manufactured by the mold assembly. The mold assembly includes a pair of support arms each supporting a corresponding carrier. The support arms are connected to a pivot point and act as levers to rotate about the pivot point to open and close the mold halves carried by the support arms through the carriers. Various latching and locking mechanisms have been developed to hold the carriers together during the forming operation. To allow for proper alignment of the mold shell during closure of the mold half carriers, one mold half carrier parting wall usually has bushings which mate with pins extending from the parting wall of the other mold half carrier. Mold assemblies of this configuration are described in U.S. Pat. No. 5,326,250 issued Jul. 5, 1994 to Doudement and published French Patent application Serial No. 2,659,265 published Sep. 17, 1991 assigned to Sidel S. A.

During the formation of the container in the mold shell, pressures as high as 600 pounds per square inch are forced into the cavity of the mold shell causing a plastic preform to expand into a container having a shape defined by the shape of the cavity of the mold shells. This formation pressure pushes the mold shells outwardly against the mold carriers and the supporting arms. Over time, these forces cause partial separation of the mold shells creating a flattened parting line defect on the plastic container formed in the mold cavity.

To compensate for parting of the mold shell halves during container formation, the aforementioned French patent application 2,659,265 has a single compensating surface area located on the outer surfaces of one of the mold half carriers. An air inlet orifice is contained in one of the support arms to direct air into this compensating surface area. The compensating surface area is approximately 15% greater than the surface area of the mold shell cavity. The compensating surface area is bounded by a continuous rectangular groove in which an O-ring is positioned to seal the periphery of the compensating surface area with an inside wall of the corresponding one support arm. The one support arm engaging the compensating surface area includes an air passageway communicating with the compensating surface area so that a compensating air pressure, in the order of 600 pounds per square inch, is forced evenly over the compensating surface area of this mold half carrier. This compensating air flow pressure pushes the mold carrier half against the expansion force associated with the air pressure being exerted outwardly from the mold cavity during container formation. As a result, the mold parts do not open during formation reducing or eliminating the formation of a parting line defect on the container.

The above described mold assemblies however do not provide for varying levels of air flow compensation pressure for different sizes of mold shell cavities. The counter pressure to the outside surface of the mold carrier should vary to accommodate for varying sizes of containers formed in the mold cavity. Compensating systems have been developed to address this problem by having multiple compensation surface areas located on the outside face of one of the carriers. Different air feeder lines are connected to the mold half carrier to supply pressurized air through the mold carrier to different groupings of the multiple compensation surface areas. That is a first feeder line passes to and through the carrier directly to one of the compensating areas while second and third feeder lines pass to and through the carrier to two other compensating areas. Control of air through the three feeder lines is located upstream of the carrier. The disadvantage with this multiple surface area air compensating system is that it requires the external or remote location of air flow controls having to be retrofitted to existing machines.

U.S. Pat. No. 6,099,286 issued Aug. 8, 2000 to Reinhold Nitsche, one of the inventors of the present invention, describes a mold carrier system that provides variable air compensation pressures for formation of bottles and containers of varying size. The mold carrier has two mold halves adapted to matingly engage each other and hold within the mold carriers interchangeable mold shells. The mold carriers each have an outside wall that has a plurality of independent air flow compensating surface areas located thereon. The air flow compensating surface areas are contained by a groove surrounding the flow compensating surfaces and an O-ring mounted in the grooves to prevent the escape of air away from the flow compensating surface areas. An air flow communication line interconnects the independent air flow compensating surface areas and includes shut off valves located in the carrier for controlling air flow between adjacent independent air flow compensating surface areas. The shut off valve has an actuator adapted to open and close the valve thereby connecting or disconnecting the independent air flow compensating surface areas located on opposite sides of the valve. The Nitsche variable air flow compensation system permits for adjustment of the compensating pressure applied to mold shells of differing cavity size during formation of a container in the cavity where the adjustment is readily accessible to an operator during a quick change over of the mold shells carried by the mold half carriers.

However, the prior art air flow compensating systems that employ an O-ring are subject to problems when the O-ring begins to wear over time. The O-ring is mounted in a rectangular groove surrounding the pressure compensating surface area. As the 600 pounds per square inch of air pressure is applied against the compensating pressure surface areas, the O-rings hold the air pressure in place. During each pressurization of the formation of the molds, the O-rings have a tendency to roll in the rectangular groove and wear down. Wearing of the O-ring results in air escaping away from the air compensating surface areas. Once the O-ring has degraded to a point where the escape of air is significant, then the pressure compensating effect of the mold carrier is lost. At this time the mold has to be shut down and the O-ring replaced. This unscheduled shut-down usually effects all mold carriers in the molding operation.

Accordingly, there is a need to provide for variable pressure compensation in mold carriers that is less susceptible to problems associated with O-ring wear.

SUMMARY OF THE INVENTION

The present invention relates to a mold half carrier suitable for use in a mold assembly. The rear face has a first air flow compensating system having a first air flow compensating surface area adapted to provide air flow compensation for the formation of smaller containers. The rear face has a second air flow compensating system having a second air flow compensating surface area enclosing the first air flow compensating surface area. The first and second air flow compensating surface systems are utilized to provide pressure compensation across the rear face of the mold half carrier for formation of larger containers.

The first and second air flow compensating systems comprise a common first continuous groove and a first O-ring positioned in sealing relation in the first single continuous groove that separates the first and second air flow compensating surface areas. The first continuous groove encloses or defines the first air flow compensating area. The second air flow compensating system further comprises a second continuous groove and a second O-ring positioned in sealing relation in the second continuous groove that surround the second air flow compensating surface area. The second continuous groove together with the first continuous groove defines between them the second first air flow compensating area.

The mold half carrier is supported in a mold assembly by a support arm. The support arm covers the rear face of the mold half carrier and seals against the first and second O-rings closing the first and second air compensating systems to create closed systems. The support arm includes at least one air flow feeder passage for delivery of pressurized air into the first air compensating system or alternatively into both the first and second air flow compensating systems. Pressurized air flowing into the closed systems compensates for forces that tend to part of the mold shell halves during container formation.

An air flow communication passage, in one embodiment, is located in the mold half carrier extending between the first air flow compensating system and the second air flow compensating system. A shut off valve controls air flow through the air flow communication passage to select the air flow compensation required for the formation of smaller and larger containers. The shut off valve is movable between a closed position preventing air flow along the air flow communication passage between the first and second air flow compensating systems and an open position permitting the flow of pressurized air into the second air flow compensating system from the first air flow compensating system. The shut off valve in this one embodiment is an embodiment of an air flow compensating pressure controller for selectively pressurizing a selected one of the first air flow compensating system and a combination of the first and second air flow compensating systems. Alternatively, the air flow compensating pressure controller may be embodied as a valve located adjacent to the mold half carrier in air flow communication with the first and second air flow compensating systems to selectively pressurize either the first air flow compensating system, or a combination of the first and second air flow compensating systems.

An exhaust air passage extends from the second air flow compensating surface to an outlet port for permitting bleeding air flow from the second air flow compensating system only when the first air flow compensating system is selectively pressurized. This occurs in the embodiment that utilizes the shut off valve when the shut off valve is in the closed position. This is particularly advantageous during the formation of smaller containers in the event air escapes from the first compensating surface area directly into the surrounding second compensating surface when the shut off valve is in its closed position. The bleeding of air out through the exhaust air passage prevents an excessive build up of undesirable air pressure in the second air flow compensating system when a smaller container is being formed. Also, in the event the escape of air from the first air flow compensating system directly into the surrounding second air flow compensating system during the formation of smaller containers becomes too great for the exhaust air passage to dissipate, the mold carrier can have its shut off valve opened to allow air pressure to build up in the second air compensating system until such time as a shut down of the molding machine can be scheduled.

In one embodiment, the first air flow compensating surface area comprises a local surface area portion and a remote surface area portion vertically adjacent the local surface area portion. The local surface area portion covers the rear face of the mold half carrier adjacent to the positioning of containers of smaller size within the carrier. The local surface area portion covers more of the rear face than the remote surface area portion. Hence, requisite air compensation pressure is provided adjacent where the container is formed in the mold by selectively utilizing either the first air flow compensating system or both the first and second air flow compensating systems. Also, compensation is provided by the first air flow compensation system vertically along the rear face of the mold carrier remotely of where the smaller container is not formed in the mold. By providing air flow compensation vertically along the rear face and not just locally of the smaller container, the first air flow compensating system reduces the risk of the mold carrier support arms becoming canted or unbalanced, and adversely effecting container formation.

The mold assembly in one embodiment comprises two mold half shells defining a cavity whose shape corresponds to side walls of a container to be formed in the assembly and the two mold half carriers each having a corresponding one of the mold half shells releasibly secured thereto. The two mold half carriers are moveable between an open position allowing access to the mold half shells and a closed position for formation of the container within the cavity. At least one of the mold half carriers has the first and second air flow compensating systems, the air flow communication passage, the shut off valve and the air exhaust passage. The mold assembly further includes an air flow supply for supplying pressurized air to the first air flow compensating system to provide a compensating pressure to the mold shells during container formation.

In accordance with an embodiment of the present invention there is provided a mold half carrier for use in a mold assembly having air flow compensation. The mold half carrier comprises a rear face having a first air flow compensating system having a first air flow compensating surface area located on the rear face, and the rear face having a second air flow compensating system having a second air flow compensating surface area located on the rear face and enclosing the first air flow compensating surface area. An air flow communication passage is located in the mold half carrier extending between the first air flow compensating system and the second air flow compensating system. A shut off valve is located in the mold half carrier for controlling air flow through the air flow communication passage. The shut off valve is movable between a closed position preventing air flow along the air flow communication passage between the first and second air flow compensating systems and an open position permitting the flow of pressurized air into the second air flow compensating system from the first air flow compensating system. An exhaust air passage is located in the mold half carrier extending from the second air flow compensating surface area to an outlet port for permitting bleeding air flow from the second air flow compensating system when the shut off valve is in the closed position. In accordance with another embodiment of the present invention there is provided a mold assembly comprising a mold half carrier having air flow compensation. The mold half carrier comprises a rear face having a first air flow compensating system having a first air flow compensating surface area located on the rear face. The rear face has a second air flow compensating system having a second air flow compensating surface area located on the rear face and enclosing the first air flow compensating surface area. The assembly has an air flow compensating pressure controller for selectively pressurizing a selected one of the first air flow compensating system and a combination of the first and second air flow compensating systems. The assembly has an exhaust air passage located in the mold half carrier extending from the second air flow compensating surface area to an outlet port for permitting bleeding air flow from the second air flow compensating system only when the first air flow compensating system is selectively pressurized. In accordance with another embodiment there is also provided a mold half carrier for use in a mold assembly having air flow compensation. The mold half carrier comprises a rear face having at least one air flow compensating surface area located on the rear face bounded by a continuous groove recessed in the rear face and an O-ring mounted in the groove. The continuous groove in cross-section has an auxiliary stepped recessed groove portion located beside the flow compensating surface area, and a main recessed groove portion for receiving the O-ring. The main recessed groove portion is located beside the auxiliary stepped recessed groove portion further from the flow compensating surface area than the auxiliary stepped recessed groove portion. The main recessed groove portion has a concave curvature adapted for seating the O-ring. The main recessed groove portion is recessed further from the rear face than the auxiliary stepped recessed groove portion whereby the main recessed groove portion seats the O-ring and the auxiliary stepped recessed groove portion is adapted to receive a deflected portion of the O-ring.

BRIEF DESCRIPTION OF THE DRAWINGS

For a better understanding of the nature and objects of the present invention reference may be had by way of example to the accompanying diagrammatic drawings.

DETAILED DESCRIPTION OF THE INVENTION

Referring to the drawings an embodiment of the present invention relates to a mold carrier adapted to provide varying compensation forces dependent on the size of the mold shell cavity so as to maintain the mold shells closed during formation of a container in the cavity between the mold shells.

Figure 1:
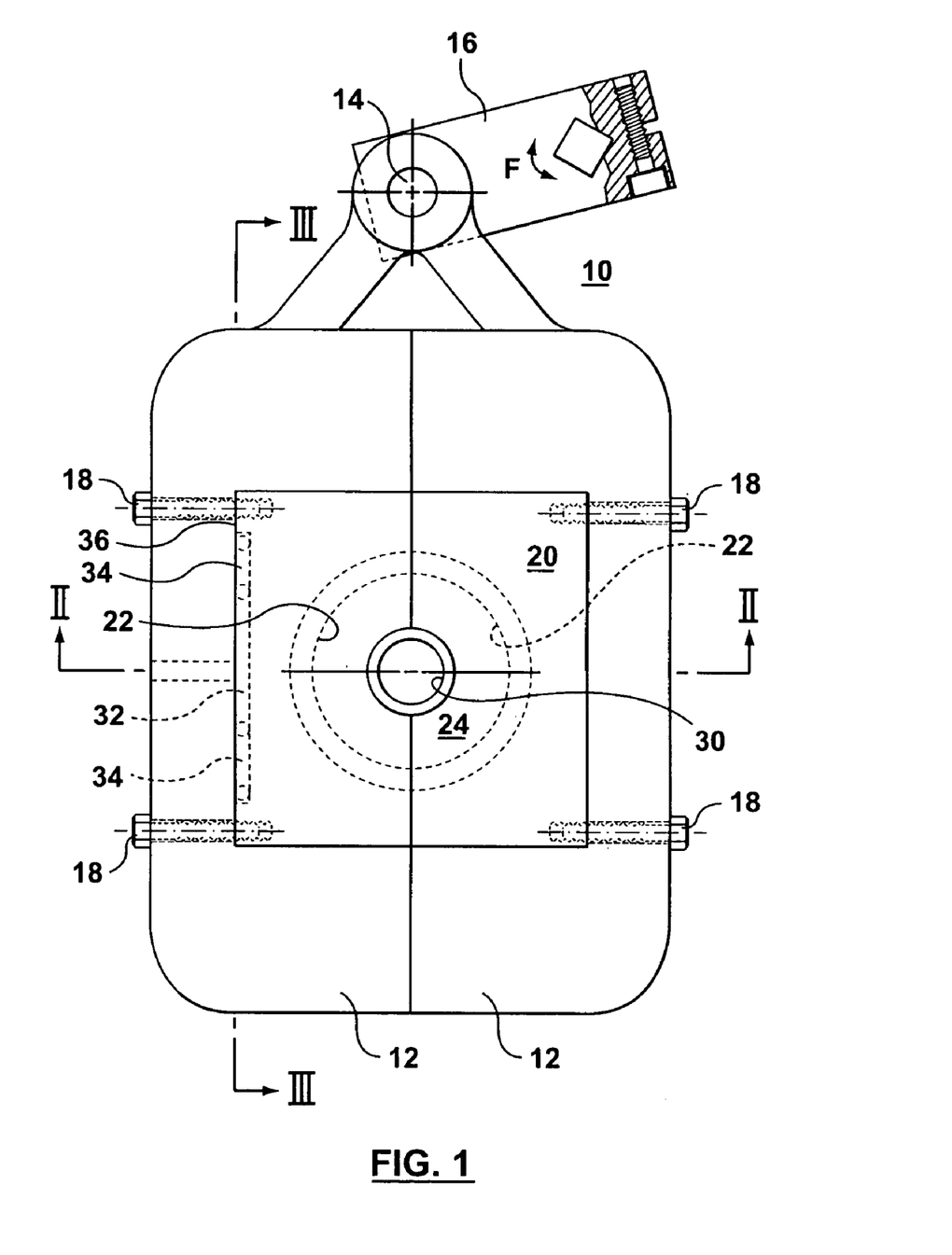
FIG. 1 is a plan view of the mold assembly having the location of the compensating systems shown in broken lines.
Figure 2:
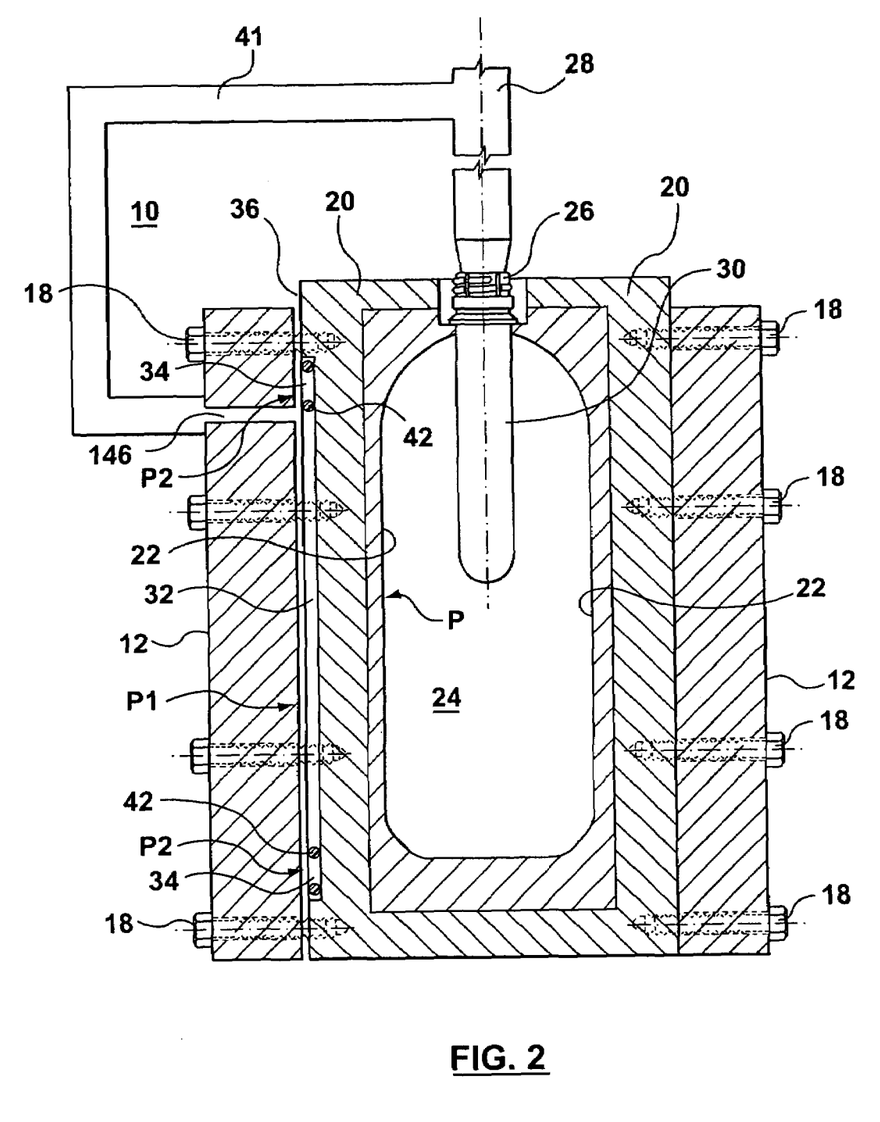
FIG. 2 is a side sectional view of the mold assembly as seen at lines II—II FIG. 1.

In FIGS. 1 and 2, the mold assembly 10 includes a pair of support arms 12 which pivot about pivot pin or axis 14. A lever arm 16 causes the support arms 12 to pivot about axis 14 to move the support arms 12 into the closed position shown. The support arms 12 support, through threaded bolts 18 two mold half carriers 20. The support arms 12 cover the rear face of the mold half carriers 20. The mold half carriers 20 each carry one half of a mold shell 22 on a face opposite to the rear face 36. In the closed position shown, mold shells 22 define a cavity 24 whose shape determines the shape of the container formed in the cavity 24. During container formation, the support arms 12 hold the mold half carriers 20 and shells 22 in the closed position shown. Pressurized air is blown into the mold causing preform 30 to expand into the cavity 24 and contact the inside walls of mold shells 22 to thereby shape the container being formed. Later in the formation, the support arms 12 are pivoted about axis 14 to separate the carriers 20 and shells 22 to permit removal of the formed container. It should be understood that a mold base carrying a base shell defining the shape of the container base has not been shown in the drawings for simplicity; however, the use of base inserts to shape the base of the container is a common practice in container formation.

The attachment of the mold shells 22 to the mold half carriers 20 by means of quick change screws and latches is known in the art and has not been shown in the drawings. However, it should be understood that while the mold half shells 22 shown in FIG. 2 define a cavity that extends vertically along the carriers 20. In some instances the shell 22 extends only a partial distance down from the top of the mold assembly such as, for example, one-third or one-half the distance. While the mold shell 22 can extend at various lengths, the mold half carriers 20 shown in FIG. 2 extend the entire height of the jig assembly and co-extend with the support arms 12.

In FIG. 2 there is shown a neck 26 of the preform 30 passing through the top of the mold assembly 10 between the mold half carriers 20. Neck 26 is connected to air inlet passage 28. Pressurized air is fed through neck 26 to the plastic preform 30 contained in the cavity 24 between the mold half shells 22. This causes the preform 30 to expand to the shape of the inside walls of cavity 24 to form a container. During container formation, an outwardly directed pressure "P" is exerted against the mold shells 22. This pressure "P" is transferred to the mold half carriers 20 and the support arms 12 tending to open the support arms 12. While the support arms 12 are typically latched together (not shown) to prevent premature opening of the support arms 12, repeated mold forming operations tend to cause these support arms 12 to open by as little as a few thousands of an inch. This causes parting of the mold half carriers 20 and the mold half shells 22. As a consequence, the plastic of the preform flows into the crevice created between the mold shells 22 causing a parting line to be visible along an outside surface of the container formed in the mold assembly 10.

To overcome this parting line problem and to accommodate for mold shell cavities of varying size, height and shape, the present invention provides for varying compensating air pressures of $P_1$ or $P_1+P_2$ that counteract the injection air pressure that is forced outwardly as shown by pressure "P". The air compensating pressures $P_1$ and $P_2$ are achieved by at least one mold half carrier 20 having two air flow compensating surface areas 32 and 34. These surface areas 32, 34 are shown in FIGS. 1 to 3 to be located on a rear face 36 of one carrier 20.

Figure 3:
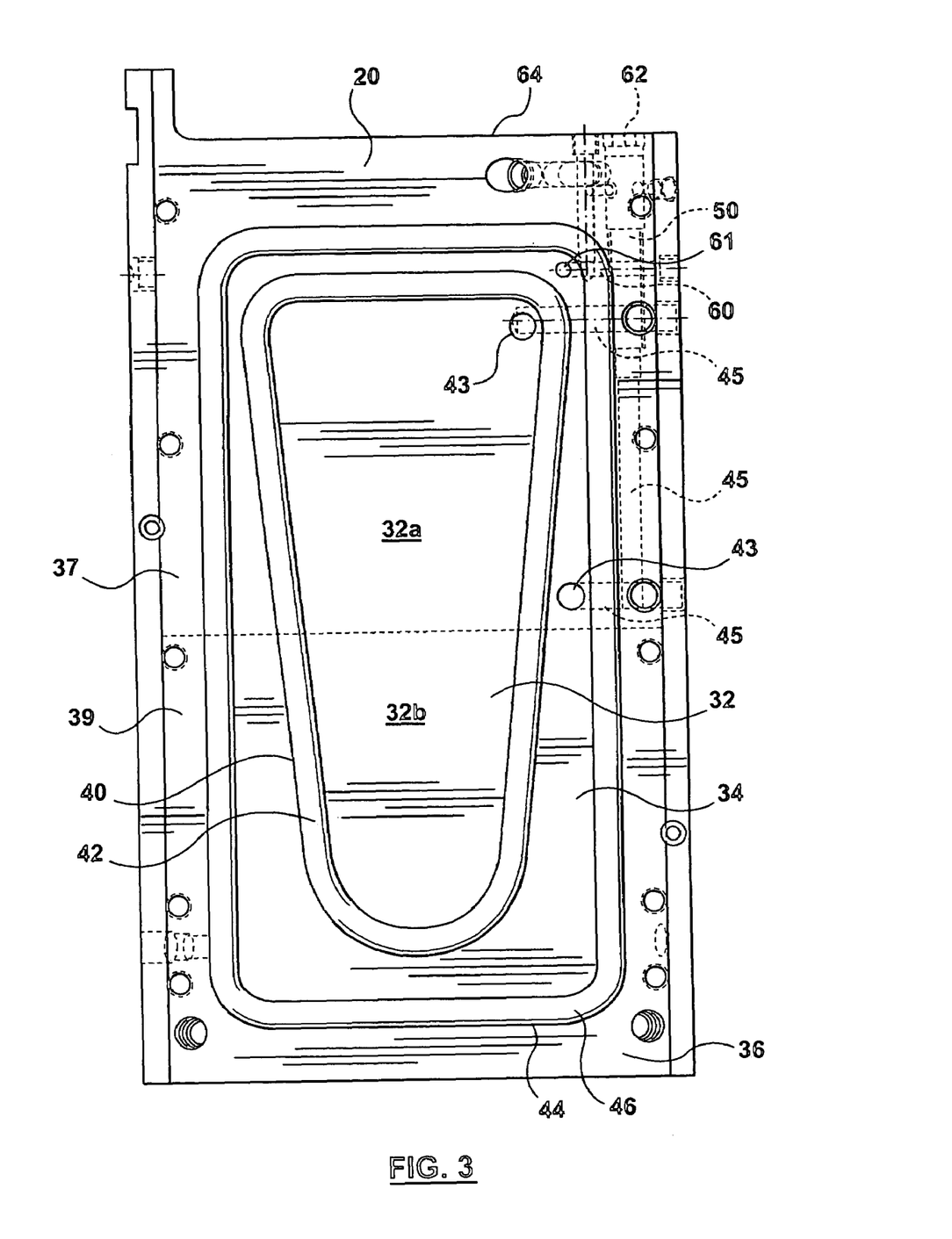
FIG. 3 is a back view showing the rear surface of one of the mold half carriers of the present invention as seen at lines III—III of FIG. 1.

In FIG. 3, the rear face 36 is shown to have top and bottom rear half surface portions 37 and 39 with top portion 37 being located above bottom portion 39. The air flow compensating surface area 32 is located on the rear face 36 and covers more of the upper rear half surface portion 37 than the lower rear half surface portion 39. The shape of the inner air flow compensating surface area 32 is generally triangular with rounded corners in the illustrated embodiment. The first air flow compensating surface area 32 comprises a local surface area portion 32a and a remote surface area portion 32b vertically adjacent the local surface area portion 32a. The local surface area portion 32a covers the rear face 36 of the mold half carrier 20 adjacent to the positioning of containers of smaller size within the carrier. The local surface area portion 32a covers more of the rear face than the remote surface area portion 32b.

The outer air flow compensating surface area 34 encloses this first air flow compensating surface area 32. The outer air flow compensating surface area 34 has a generally rectangular shape with rounded corners and surrounds the inner air flow compensating surface area 32. The inner air flow compensating surface area 32 permits for a pressure $P_1$ to be applied to the rear face 36 of the mold carrier 20 to provide a compensating force for the formation of smaller containers. When a larger container is used, air flow compensating pressure flows into both the inner and outer air flow compensating surface areas 32, 34.

The inner and outer air flow compensating systems 32, 34 are normally maintained independent and separate of each other by a commonly shared single continuous groove 40 and sealing O-ring 42 sealing against the surface of the corresponding support arm 12. The O-ring 42 is positioned in sealing relation with single continuous groove 40 when the arms 12 are in the closed position during container formation. The outer air flow compensating surface area 34 is surrounded by a second continuous groove 44 and a second continuous sealing O-ring 46 positioned in sealing relation with the second continuous groove 44 when arms 12 are closed.

In FIG. 2, pressurized air is fed to the inner compensating surface area 32 through the corresponding support arm 12. The support arm 12 includes a feeder line air inlet passage 146 that communicates air from inlet line 41. In the illustrated embodiment, there is no shut off associated with the supply of pressurized air to the inner compensating system 32. Consequently a compensating air pressure $P_1$ is continuously present at the inner most compensating surface area 32 during container formation.

Figure 4:
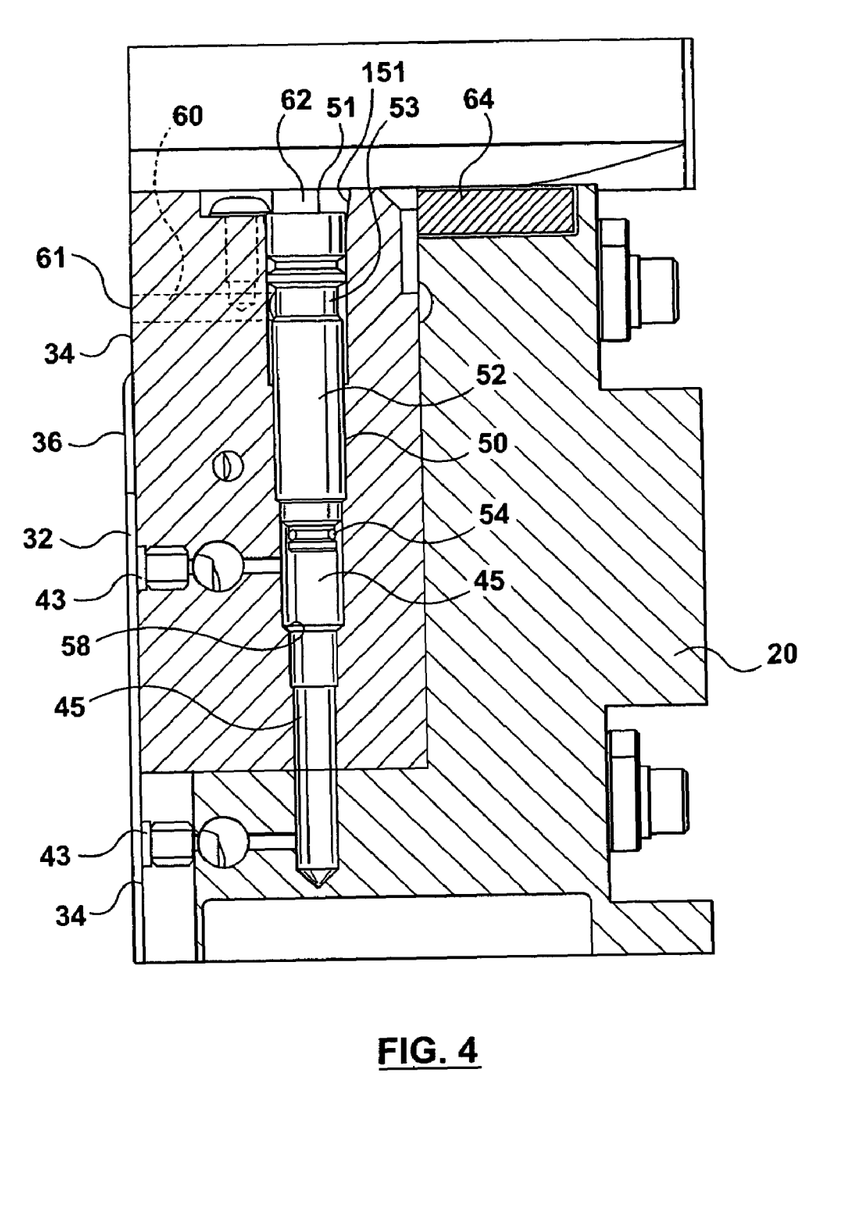
FIG. 4 is a section of the one mold half carrier of the present invention showing the shut off valve in the open position and the exhaust passage closed.
Figure 5:
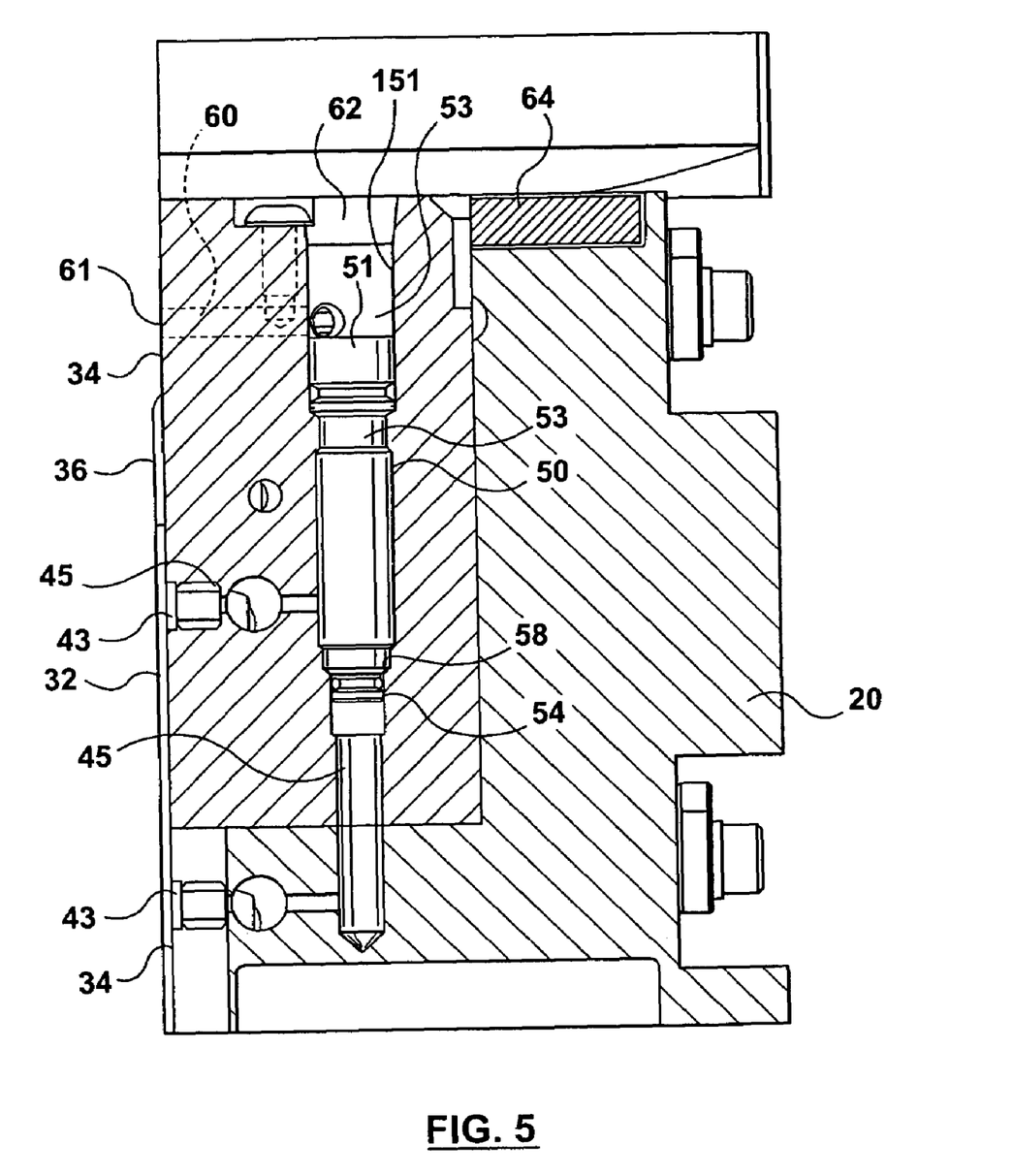
FIG. 5 is a section of the one mold half carrier of the present invention showing the shut off valve in the closed position and the exhaust passage open.

In FIGS. 3, 4, and 5, the air flow compensating surface areas 32, 34 each include a vent opening 43 in the rear surface of the one carrier 20. The vent openings 43 are connected to each other in a series manner by an air flow communication passage 45 extending through the carrier 20. When pressurized air is permitted to flow along passageway 45 by shut off valve 50, air from the innermost compensating area 32 flows out its corresponding vent opening 43 along passageway 45 and into the outer most compensation surface area 34 through its corresponding vent openings 43. This results in additional air flow compensating pressure $P_2$.

The mold half carrier 20 has an exhaust air passage 60 located therein that extends from a bleed vent opening 61, in the second air flow compensating surface area 34 to an outlet port 62 located in a first end 64 of the mold carrier 20. This exhaust air passageway 60 is provided to bleed air from the second air flow compensating surface area 34 in the event of a partial escape of the pressurized air across the O-ring seal 42 into the outer air flow compensating surface area 34.

The shut off valve 50 is shown in FIGS. 3 to 5 for controlling air flow through the air flow communication passage 45 so as to regulate the cumulative compensating pressures $P_1$ and $P_2$. The shut off valve has a valve stem 52 movably seated in bore 151 in the mold half carrier 20. The valve stem 52 has a sealing head portion 51 for controlling flow of air through the air exhaust passage 61. The valve stem 52 has a sealing end portion 54 for controlling the flow of pressurized air through passage 45.

FIG. 4 shows the shut off valve 50 open permitting air flow into the outer compensating area 34 from the inner compensating area 32 resulting in a compensating air flow pressure of $P_1+P_2$. In this position, the valve stem 52 is retracted and the sealing end portion 54 is spaced from valve seat 58. In this position, the exhaust passage 60 is closed by the sealing head portion 53 of the shut off valve 50. This is the set up for the shut off valve utilized by an operator in the formation of larger containers.

In FIG. 5, the shut off valve 50 is closed to shut off compensating air flow into the outer compensating air surface areas 34. In this position the valve stem 52 is advanced to move the sealing end portion 54 into engagement with valve seat 58. In this position, the shut off valve 50 has its sealing head portion 53 spaced from the air exhaust passage 60 to permit air to escape to atmosphere through bore 151. This is the set up used by an operator when smaller mold shell cavities are formed in the mold assembly.

Figure 6:
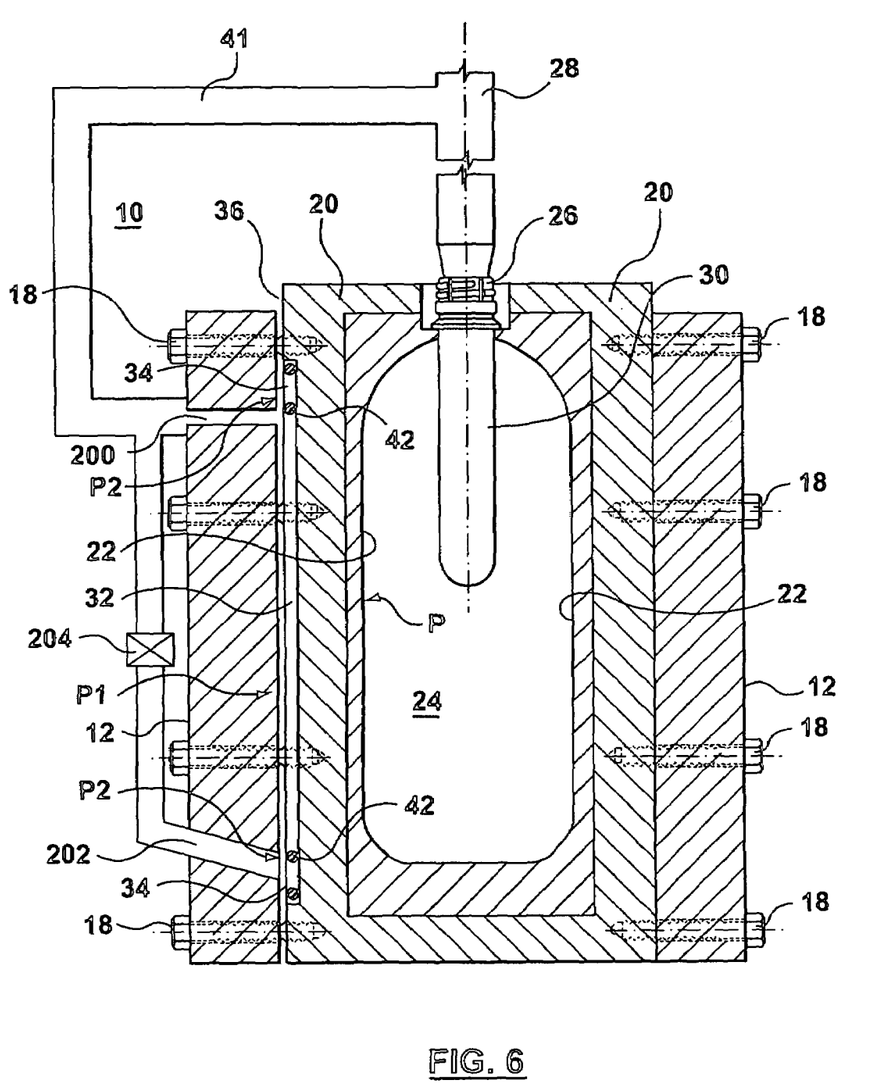
FIG. 6 is a view similar to FIG. 2 showing an alternative embodiment of the present invention; and, FIGS. 7a and 7b are partial sectional views of an embodiment of a groove and O-ring assembly for the air flow compensating systems.

Referring to FIG. 6 there is shown an alternative embodiment for the air flow compensating pressure controller. In FIG. 6, like numerals to FIG. 2 represent the same parts that function as described above for FIG. 2. In FIG. 6, the support arm 12 includes two air flow feeder passages 200, 202, each for delivery of pressurized air into a corresponding one the first and second air compensating systems. Selective air flow of into feeder passage 202 is controlled by the air flow compensating pressure controller 204 which is a valve that can be controlled either manually or by automatic remote operation to selectively permit pressurized air flow against either only the first air flow compensating area 32, or a combination of both the first and second air flow compensating areas 32, 34. It should be understood that in this embodiment no communication passage, such as passage 45 in FIG. 3, is required to communicate pressurized air between the first and second air flow compensation surfaces 32, 34.

Figure 7A:
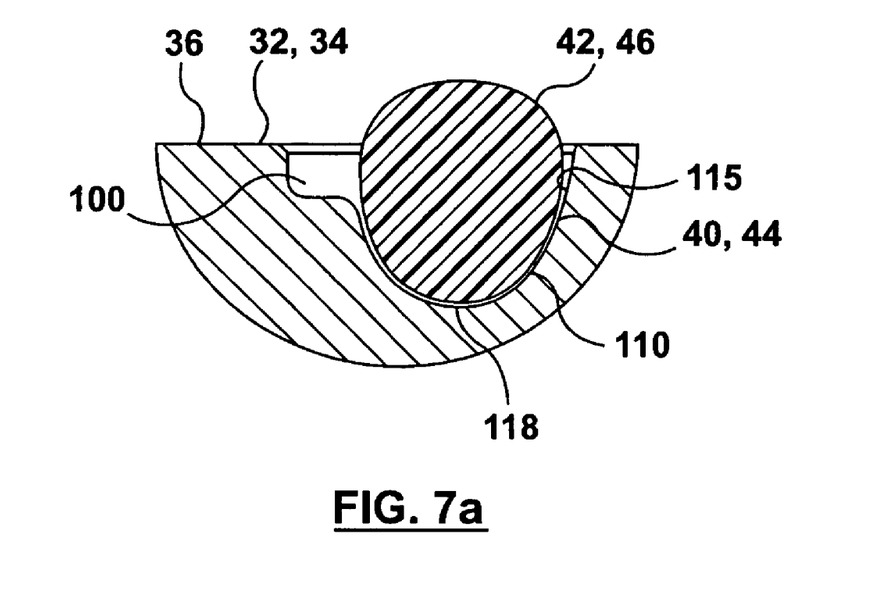
Figure 7B:
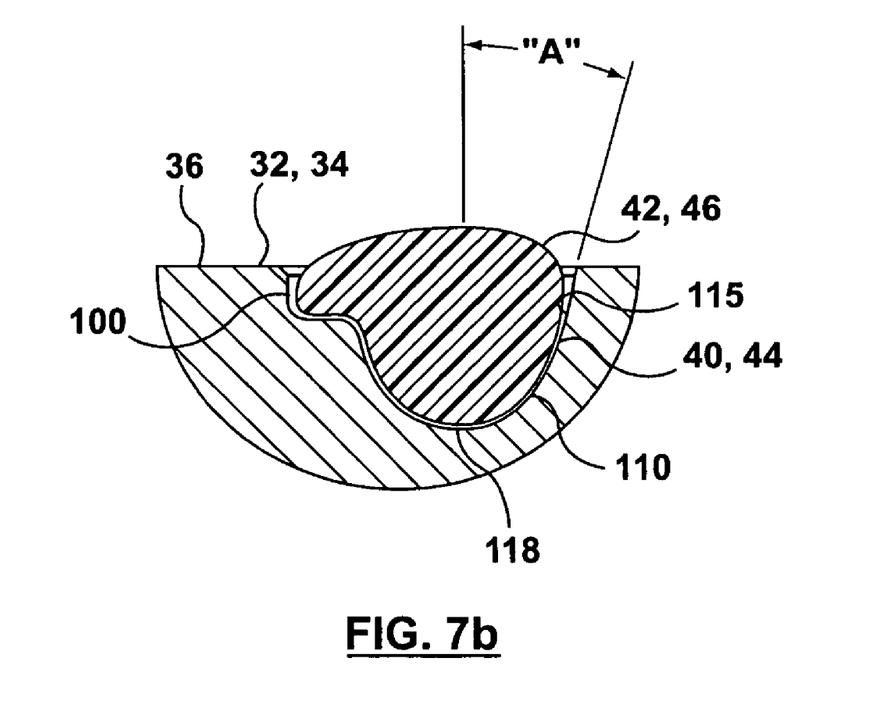

Referring to FIGS. 7a and 7b, a cross section of the preferred groove of grooves 40, 44 and O-ring assemblies 42, 46 of the present invention is shown. It should be understood that the grooves 40, 44 could alternatively have a rectangular shape but preferably the continuous grooves 40, 44 are recessed in the rear face 36 in the manner shown in FIGS. 7a and 7b.

The groove 40, 44 in cross section, has an auxiliary stepped recessed groove portion 100 located beside the corresponding flow compensating surface area 32, 34. That is to say that the portion of groove 40, 44 that bounds a corresponding flow compensating surface area 32, 34 has the auxiliary stepped recessed groove portion 100 located beside the flow compensating surface area 32, 34. The groove 40, 44 further has a main recessed groove portion 110 for receiving the O-ring. The main recessed groove portion 110 is located beside the auxiliary stepped recessed groove portion 100 and is located further from the corresponding flow compensating surface area 32, 34 than the auxiliary stepped recessed groove portion 100. The main recessed groove portion 110 has a concave curvature, as shown, that is adapted for seating the O-ring. The main recessed groove portion is recessed further from the rear face 36 than the auxiliary stepped groove portion 100. As a result, the main recessed groove portion 110 seats the O-ring and the auxiliary stepped recessed groove portion 100 receives a deflected portion of the O-ring during flow compensation application as shown in FIG. 7b. By seating it is meant that the O-ring is able to be forced against a surface that generally follows its shape and thereby acts as a crater preventing the O-ring from rolling. The auxiliary stepped recessed groove portion 100 is sized to accommodate the deflected portion of the O-ring during air flow compensation. The size of the auxiliary stepped recessed groove portion 100 is preferably slightly larger than the amount of the deflected portion of the O-ring that would be seated in the auxiliary stepped recessed groove portion 100.

The concave curvature of the main recessed groove portion 110 has an outwardly angled flat sidewall portion 115 immediately adjacent the rear face 36 on a side of the main recessed groove portion 110 opposite to the auxiliary stepped groove portion 100. This angle is shown as "A: in FIG. 7b and is in other order of about 10 degrees outwardly from mid-recessed point 118 for the main recessed groove portion 110. The concave curvature has a generally arcuate curvature that is bowed deeper into the rear face at the mid-recessed point 118.

While the invention has been described in connection with the illustrated embodiment, it is to be understood that the invention is not to be limited to this embodiment, but on the contrary, is intended to cover various modifications and equivalent arrangements included within the spirit and scope of the appended claims.

What is claimed is:

1. A mold assembly comprising:
   a mold half carrier having air flow compensation, the mold half carrier comprising a rear face having a first air flow compensating system having a first air flow compensating surface area located on the rear face, and the rear face having a second air flow compensating system having a second air flow compensating surface area located on the rear face and enclosing the first air flow compensating surface area;
   an air flow compensating pressure controller for selectively pressurizing a selected one of the first air flow compensating system and a combination of the first and second air flow compensating systems; and,
   an exhaust air passage located in the mold half carrier extending from the second air flow compensating surface area to an outlet port for permitting bleeding air flow from the second air flow compensating system only when the first air flow compensating system is selectively pressurized.

2. The mold assembly of claim 1 wherein the mold half carrier is adapted for forming containers of relatively smaller and larger sizes, wherein the first and second air flow compensating surface areas are utilized in the formation of containers of larger size and the first air flow compensating surface area is utilized in the formation of containers of smaller size, and wherein the first air flow compensating surface area comprises a local surface area portion and a remote surface area portion vertically adjacent the local surface area portion, the local surface area portion covering the rear face of the mold half carrier adjacent to positioning of containers of smaller size within the mold half carrier, and the local surface area portion covering more of the rear face than the remote surface area portion.

3. The mold assembly of claim 1 wherein the rear face has top and bottom rear half surface portions and wherein the first air flow compensating surface area located on the rear face extends over more of the top half rear surface portion than the bottom half rear surface portion.

4. The mold assembly of claim 3 wherein the shape of the first air flow compensating surface area is generally triangular with rounded corners.

5. The mold assembly of claim 1 wherein the first and second air flow compensating systems comprise a first continuous groove and a first O-ring positioned in sealing relation in the first single continuous groove that separates the first and second air flow compensating surface areas.

6. The mold assembly of claim 5 wherein the second air flow compensating system further comprises a second continuous groove and a second O-ring positioned in sealing relation in the second continuous groove that surround the second air flow compensating surface area.

7. The mold assembly of claim 1 wherein the air flow compensating pressure controller comprises a shut off valve located in the mold half carrier for controlling air flow between the first and second air flow compensating systems.

8. The mold assembly of claim 1 further comprising a support arm for supporting the one mold half carrier and covering the rear face to close the first and second air compensating systems, the support arm comprising two air flow feeder passages each for delivery of pressurized air into a corresponding one the first and second air compensating systems, and wherein the air flow compensating pressure controller controls air flow along the feeder passages.

9. A mold half carrier for use in a mold assembly having air flow compensation, the mold half carrier comprising:
   a rear face having a first air flow compensating system having a first air flow compensating surface area located on the rear face, and the rear face having a second air flow compensating system having a second air flow compensating surface area located on the rear face and enclosing the first air flow compensating surface area;
   an air flow communication passage located in the mold half carrier extending between the first air flow compensating system and the second air flow compensating system;
   a shut off valve located in the mold half carrier for controlling air flow through the air flow communication passage, the shut off valve being movable between a closed position preventing air flow along the air flow communication passage between the first and second air flow compensating systems and an open position permitting the flow of pressurized air into the second air flow compensating system from the first air flow compensating system; and,
   an exhaust air passage located in the mold half carrier extending from the second air flow compensating surface area to an outlet port for permitting bleeding air flow from the second air flow compensating system when the shut off valve is in the closed position.

10. The mold half carrier of claim 9, adapted for forming containers of relatively smaller and larger sizes, wherein the first and second air flow compensating surface areas are utilized in the formation of containers of larger size and the first air flow compensating surface area is utilized in the formation of containers of smaller size, and wherein the first air flow compensating surface area comprises a local surface area portion and a remote surface area portion vertically adjacent the local surface area portion, the local surface area portion covering the rear face of the mold half carrier adjacent to positioning of containers of smaller size within the mold half carrier, and the local surface area portion covering more of the rear face than the remote surface area portion.

11. The mold half carrier of claim 9 wherein the rear face has top and bottom rear half surface portions and wherein the first air flow compensating surface area located on the rear face extends over more of the top half rear surface portion than the bottom half rear surface portion.

12. The mold half carrier of claim 11 wherein the shape of the first air flow compensating surface area is generally triangular with rounded corners.

13. The mold half carrier of claim 9 wherein the shut off valve controls bleeding air flow along the exhaust air passage.

14. The mold half carrier of claim 9 wherein the first and second air flow compensating systems comprise a first continuous groove and a first O-ring positioned in sealing relation in the first single continuous groove that separates the first and second air flow compensating surface areas.

15. The mold half carrier of claim 14 wherein the second air flow compensating system further comprises a second continuous groove and a second O-ring positioned in sealing relation in the second continuous groove that surround the second air flow compensating surface area.

16. The mold half carrier of claim 15 adapted to be supported by a support arm, the support arm supports the one mold half carrier covering the rear face and sealing against the first and second O-rings to close the first and second air compensating systems, the support arm includes an air flow feeder passage for delivery of pressurized air into the first air compensating system.

17. The mold half carrier of claim 9 wherein the mold half carrier includes a first end surface having at least one bore extending from the end surface into the one mold half carrier to a valve seat in the air flow communication passage between the first and second air flow compensating systems, and the shut off valve comprises a stem movably seated in the valve seat, the stem having a sealing head portion and a sealing end portion, the stem being movable to advance and to retract the sealing head portion and the sealing end portion respectively to close the air flow communication passage and open the exhaust air passage, and to open the air flow communication passage and close the exhaust air passage.

18. A mold assembly comprising:
two mold half shells defining a cavity whose shape corresponds to side walls of a container to be formed in the assembly;
two mold half carriers each having a corresponding one of the mold half shells releasibly secured thereto, the two mold half carriers being moveable between an open position allowing access to the mold half shells and a closed position for formation of the container within the cavity, at least one of the mold half carriers having a rear face having a first air flow compensating system having a first air flow compensating surface area located on the rear face, and the rear face having a second air flow compensating system having a second air flow compensating surface area located on the rear face and enclosing the first air flow compensating surface area;
an air flow supply for supplying pressurized air to the first air flow compensating system to provide a compensating pressure to the mold shells during container formation;
an air flow communication passage located in the at least one mold half carrier extending between the first air flow compensating system and the second air flow compensating system;
a shut off valve located in the at least one mold half carrier for controlling air flow through the air flow communication passage, the shut off valve being movable between a closed position preventing air flow along the air flow communication passage between the first and second air flow compensating systems and an open position permitting the flow of pressurized air into the second air flow compensating system from the first air flow compensating system; and,
an exhaust air passage located in the mold half carrier extending from the second air flow compensating surface area to an outlet port for permitting bleeding air flow from the second air flow compensating system when the shut off valve is in the closed position.

19. The mold assembly of claim 18, adapted for forming containers of relatively smaller and larger sizes, wherein the first and second air flow compensating surface areas are utilized in the formation of containers of larger size and the first air flow compensating surface area is utilized in the formation of containers of smaller size, and wherein the first air flow compensating surface area comprises a local surface area portion and a remote surface area portion vertically adjacent the local surface area portion, the local surface area portion covering the rear face of the one mold half carrier adjacent to positioning of containers of smaller size within the one mold half carrier, and the local surface area portion covering more of the rear face than the remote surface area portion.

20. The mold assembly of claim 18 wherein the rear face has top and bottom rear half surface portions and wherein the first air flow compensating surface area located on the rear face extends over more of the top half rear surface portion than the bottom half rear surface portion.

21. The mold half carrier of claim 18 wherein the shut off valve controls bleeding air flow along the exhaust air passage.

22. The mold half carrier of claim 18 wherein the first and second air flow compensating systems comprise a first continuous groove and a first O-ring positioned in sealing relation in the first single continuous groove that separates the first and second air flow compensating surface areas.

23. The mold half carrier of claim 22 wherein the second air flow compensating system further comprises a second continuous groove and a second O-ring positioned in sealing relation in the second continuous groove that surround the second air flow compensating surface area.

24. The mold assembly of claim 18 wherein the mold half carrier includes a first end surface having at least one bore extending from the end surface into the one mold half carrier to a valve seat in the air flow communication passage between the first and second air flow compensating systems, and the shut off valve comprises a stem movably seated in the valve seat, the stem having a sealing head portion and a sealing end portion, the stem being movable to advance and to retract the sealing head portion and the sealing end portion respectively to close the air flow communication passage and open the exhaust air passage, and to open the air flow communication passage and close the exhaust air passage.

25. The mold assembly of claim 18 wherein the mold half carriers include parting line surfaces along which the mold halves are aligned when in the closed position, and the shut off valve including a valve control stem accessible from an end surface portion of the one carrier.

26. The mold assembly of claim 23 wherein each mold half carrier is supported by a support arm, one of the support arms supporting the one mold half carrier covering the rear face and sealing against the first and second O-rings to close the first and second air compensating systems, the one support arm including an air flow feeder passage for delivery of pressurized air into the first air compensating system.

27. The mold assembly of claim 18 wherein the support arms for supporting the mold half carriers, are pivotally movable relative to each other about a common pivoting axis.

28. A mold half carrier for use in a mold assembly having air flow compensation, the mold half carrier comprising:
   a rear face having at least one air flow compensating surface area located on the rear face bounded by a continuous groove recessed in the rear face and an O-ring mounted in the groove, the continuous groove in cross-section having:
   an auxiliary stepped recessed groove portion located beside the flow compensating surface area; and
   a main recessed groove portion for receiving the O-ring, the main recessed groove portion being located beside the auxiliary stepped recessed groove portion further from the flow compensating surface area than the auxiliary stepped recessed groove portion, the main recessed groove portion having a concave curvature adapted for seating the O-ring, and the main recessed groove portion being recessed further from the rear face than the auxiliary stepped recessed groove portion whereby the main recessed groove portion seats the O-ring and the auxiliary stepped recessed groove portion is adapted to receive a deflected portion of the O-ring.

29. The mold half carrier of claim 28 wherein the auxiliary stepped recessed groove portion is sized to accommodate the deflected portion of the O-ring during air flow compensation.

30. The mold half carrier of claim 28 wherein the concave curvature of the main recessed groove portion has an outwardly angled flat sidewall portion immediately adjacent the rear face on a side of the main recessed groove portion opposite to the auxiliary stepped groove portion.

31. The mold half carrier of claim 30 wherein the angled sidewall portion is angled about 10 degrees outwardly a mid-recessed point for the main recessed groove portion.

32. The mold half carrier of claim 31 wherein the concave curvature has a substantially arcuate curvature that is bowed deeper into the rear face at the mid-recessed point.

* * * * *